US007248843B2

(12) United States Patent
Carvalho et al.

(10) Patent No.: US 7,248,843 B2
(45) Date of Patent: Jul. 24, 2007

(54) ANTENNA SELECTION SYSTEM AND METHOD

(75) Inventors: Karina P. Carvalho, Brown Deer, WI (US); Neal J. Seidl, New Berlin, WI (US); Matthew G. Grubis, New Berlin, WI (US); Ralph T. Hoctor, Saratoga Springs, NY (US); James Hurley, Menomonee Falls, WI (US); Russell A. Rymut, Hartland, WI (US)

(73) Assignee: GE Medical Systems Information Technologies, Inc., Milwaukee, WI (US)

( * ) Notice: Subject to any disclaimer, the term of this patent is extended or adjusted under 35 U.S.C. 154(b) by 623 days.

(21) Appl. No.: 10/704,430

(22) Filed: Nov. 7, 2003

(65) Prior Publication Data

US 2005/0101252 A1    May 12, 2005

(51) Int. Cl.
*H03C 1/62* (2006.01)
(52) U.S. Cl. .............................. 455/115.1; 455/115.4; 455/67.13; 455/63.1; 455/67.11
(58) Field of Classification Search ................ 455/101, 455/115.1–115.4, 63.1, 67.13, 135, 226.3
See application file for complete search history.

(56) References Cited

U.S. PATENT DOCUMENTS

| 4,539,709 | A | * | 9/1985 | Conner .................. 455/67.13 |
| 4,539,710 | A | * | 9/1985 | Dinsmore .................. 455/134 |
| 4,723,303 | A | * | 2/1988 | Koch ..................... 455/67.13 |
| 4,884,272 | A | * | 11/1989 | McConnell ................. 714/792 |
| 5,465,413 | A | * | 11/1995 | Enge et al. ................. 455/307 |
| 5,854,986 | A | * | 12/1998 | Dorren et al. ........... 455/562.1 |
| 5,963,136 | A | * | 10/1999 | O'Brien .................. 340/573.1 |
| 6,253,067 | B1 | * | 6/2001 | Tsuji ..................... 455/115.2 |
| 6,278,877 | B1 | * | 8/2001 | Brederveld et al. ......... 455/434 |
| 7,099,380 | B1 | * | 8/2006 | Feng et al. ................. 375/150 |
| 2002/0118780 | A1 | | 8/2002 | Hurley et al. |
| 2005/0101252 | A1 | * | 5/2005 | Carvalho et al. ........... 455/63.1 |
| 2005/0270412 | A1 | * | 12/2005 | Kamon et al. .............. 348/362 |

FOREIGN PATENT DOCUMENTS

JP        2001285213 A    * 10/2001

OTHER PUBLICATIONS

U.S. Appl. No. 10/694,039, filed Oct. 27, 2003, Seidl.

(Continued)

*Primary Examiner*—Matthew Anderson
*Assistant Examiner*—Minh Dao
(74) *Attorney, Agent, or Firm*—Andrus, Sceales, Starke & Sawall

(57) ABSTRACT

A system and method for wireless communication. The system can include a transmitter that transmits a data signal having a time period without data transmission. The system can also include a receiver including a first antenna, a second antenna, a switch that activates one of the first antenna and the second antenna, and a processor that estimates a first signal-to-noise ratio for the first antenna and a second signal-to-noise ratio for the second antenna during the time period without data transmission. The processor can control the switch to select one of the first antenna and the second antenna based on a comparison between the first signal-to-noise ratio and the second signal-to-noise ratio.

31 Claims, 6 Drawing Sheets

OTHER PUBLICATIONS

D.R. Pauluzzi and N.C. Beaulieu, "A Comparison of SNR Estimation Techniques for the AWGN Channel," *IEEE Transactions on Communications*, vol. 48, No. 10, pp. 1681-1691, Oct. 2000.

T.R. Benedict and T.T. Soong, "The joint estimation of signal and noise from the sum envelope," IEEE *Trans. Information Theory*, vol. IT-13, pp. 447-454, Jul. 1967.

P.J. Bickel and K.A. Doksum, *Mathematical Statistics*, Holden-Day, 1977.

V.K. Rohatgi, *An Introduction to Probability Theory and Mathematical Statistics*, John Wiley and Sons, 1976.

Murota, K. and Hirade, K. "GMSK Modulation for Digital Mobile Radio Telephony," IEEE Transaction on Communications, vol. COM-29, pp. 1044-1050, No. 7, Jul. 1981.

Pasupathy, S., "Minimum Shift Keying: A Spectrally Efficient Modulation," IEEE Communications Magazine, vol. 0163-6804/79/0700-0014, Jul. 1979.

Elnoubi, S.M. "Analysis of GMSK with Differential Detection in Land Mobile Radio Channels," IEEE Transactions on Vehicular Technology, vol. VT-35, No. 4, Nov. 1986.

R. de Buda, "Coherent demodulation of frequency-shift keying with low deviation ratio," IEEE *Trans. Communications*, vol. COM-20, pp. 429-435, Jun. 1972.

P. Galko and S. Pasupathy, "Linear receivers for correlatively coded MSK," *IEEE Trans. Communications*, vol. COM-33, Apr. 1985, pp. 338-347.

G.K. Kaleh, "Simple coherent receivers for partial response continuous phase modulation," *IEEE Journal on Selected Areas of Communication*, vol. SAC-7, Dec. 1989.

P. Laurent, "Exact and approximate construction of digital phase modulations by superposition of amplitude modulated pulses," IEEE *Trans. Communications*, vol. COM-34, pp. 150-160, Feb. 1986.

N. Al-Dhahir and G. Saulnier, "A high-performance reduced-complexity GMSK demodulator," IEEE *Trans. Communications*, vol. 46, pp. 1409-1412, Nov. 1998.

F. Amoroso and J.A. Kivett, "Simplified MSK signaling technique," IEEE *Trans. Communications*, vol. COM-25, pp. 433-441, Apr. 1977.

W.P. Osborne and M.B. Luntz, "Coherent and NonCoherent Detection of CPFSK," *IEEE Trans. Communications*, vol. COM-22, pp. 1023-1036, Aug. 1974.

M.S. Hodgart and J.A. Schoonees, "A robust MSK demodulator through DSP," *Proc. IEEE 1992 S. African Symposium on Communications and Signal Processing*, Sep. 1992.

K.H. Mueller and M.S. Muller, "Timing recovery in digital synchronous data receivers," IEEE Trans. Communications, vol. COM-24, pp. 516-531, May 1976.

T.I. Laakso, V. Valimaki, M. Karjalainen and U.K. Laine, "Splitting the unit delay," IEEE *Signal Processing Magazine*, vol. 13, pp. 30-60, Jan. 1996.

\* cited by examiner

ANTENNA SELECTION SYSTEM AND METHOD

BACKGROUND OF THE INVENTION

Spatial diversity in wireless communication systems has proven to be very effective. In multi-path propagation conditions, each receiving antenna or receiving antenna field in an antenna array experiences a different fading environment. It is likely that if one receiving antenna is in a deep fade, another receiving antenna is obtaining a sufficient signal.

In a system which uses a spatial diversity scheme, it is often necessary to pick the "best" receiving antenna field to receive data packets. The selection criteria can be based on the highest power received. Despite this method being easy to implement, it has disadvantages, such as receiving a signal with high power on a particular receiving antenna field, but with a low signal quality due to a noise source in the reception coverage area. This will result in a receiver picking a field with high power, yet resulting in a high Bit Error Rate ("BER"). Thus, an improved selection criteria is desired.

BRIEF DESCRIPTION OF THE INVENTION

In one embodiment, the invention provides a method of selecting an antenna to receive a data signal. The method includes transmitting a data signal to an antenna array. The antenna array includes at least a first antenna and a second antenna, and the data signal includes a time period without data transmission. The method also includes estimating a first signal-to-noise ratio for the first antenna and a second signal-to-noise ratio for the second antenna during the time period without data transmission, and selecting one of the first antenna and the second antenna based on a comparison between the first signal-to-noise ratio and the second signal-to-noise ratio.

In another embodiment, the invention provides communication system including a transmitter that transmits a data signal, and a receiver that receives the data signal. The data signal includes a time period without data transmission. The receiver includes a first antenna, a second antenna, a switch that activates one of the first antenna and the second antenna, and a processor that estimates a first signal-to-noise ratio for the first antenna and a second signal-to-noise ratio for the second antenna during the time period without data transmission. The processor controls the switch to select one of the first antenna and the second antenna based on a comparison between the first signal-to-noise ratio and the second signal-to-noise ratio.

DETAILED DESCRIPTION OF THE INVENTION

Figure 1:
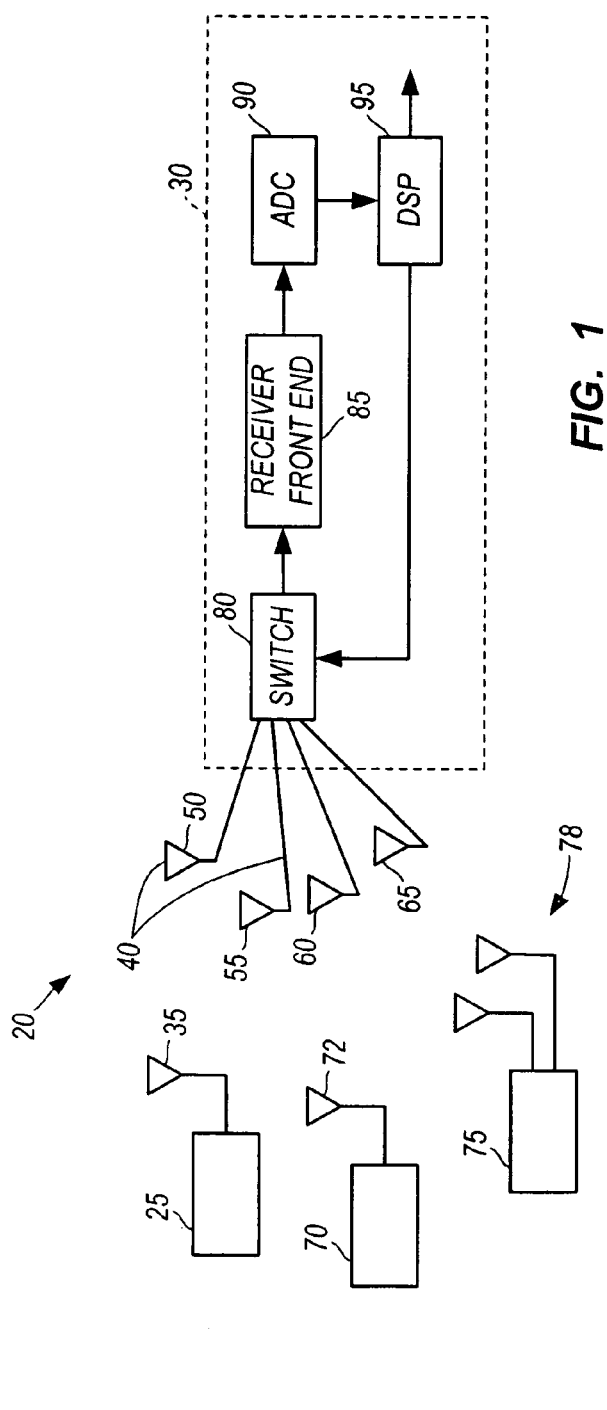
FIG. 1 is a schematic illustration of a wireless communication system embodying the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limited. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings and can include electrical connections and couplings, whether direct or indirect.

In addition, it should be understood that embodiments of the invention include both hardware and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software. As such, it should be noted that a plurality of hardware and software based devices, as well as a plurality of different structural components may be utilized to implement the invention. Furthermore, and as described in subsequent paragraphs, the specific mechanical configurations illustrated in the drawings are intended to exemplify embodiments of the invention and that other alternative mechanical configurations are possible.

FIG. 1 illustrates a wireless communication system 20 according to one embodiment of the invention. The communication system 20 can include a transmitter 25 and a receiver 30. As shown in FIG. 1, the transmitter 25 can include a transmitting antenna 35 and the receiver 30 can include a receiving antenna array 40. The communication system 20 can also include additional transmitters, such as a second transmitter 70 coupled to a second transmitting antenna 72, and/or a third transmitter 75 coupled to a transmitting antenna array 78. In other embodiments, the communication system 20 can include more or less transmitters than illustrated in FIG. 1, and can include more or less transmitting antennas, fields and/or transmitting antenna arrays than illustrated in FIG. 1. In one embodiment, the transmitters 25, 70, and 75 are included in different mobile devices, such as, for example, mobile cell phones or telemetry units attached to ambulatory patients.

In one embodiment, the receiving antenna array 40 can include the following four receiving antenna fields: a first receiving antenna field 50, a second receiving antenna field 55, a third receiving antenna field 60, and a fourth receiving antenna field 65. Each receiving antenna field 50, 55, 60, and 65 can include a single antenna, as illustrated in FIG. 1, or can include multiple antennas that can be connected, but can be located at widely-spaced sites. In other embodiments, the receiving antenna array 40 can include more or less antennas and/or fields than in the embodiment illustrated in FIG. 1.

The receiver 30 can access all the receiving antenna fields 50, 55, 60, and 65, and can electronically switch between the receiving antenna fields 50, 55, 60, and 65, based on certain signal parameters, as will be discussed below. The receiver 30 can employ an antenna-switching algorithm to select the antenna field to receive the modulated signal (i.e., to receive the transmitted data). As shown in FIG. 1, the receiver 30 includes a analog switch or switching module 80, a receiver front-end 85, an analog-to-digital converter ("ADC") or baseband receiver 90, and a digital signal processor ("DSP") 95. The receiver front-end 85 can perform necessary amplification and filtering of received and modulated signals, and the baseband receiver 90 can perform demodulation and signal parameter estimations. In one embodiment, the DSP 95 can control the analog switch 80. The DSP 95 can acquire a digitized, complex baseband signal from the baseband receiver 90, and can compute the in-band power available from each receiving field antenna 50, 55, 60, and 65 associated with the receiving antenna array 78. The DSP 95 can send a control signal to the analog switch 80 to select or activate a desired receiving antenna field, as will be discussed below.

The transmitter 25 (and transmitters 70 and 75) can modulate payload data (e.g., data to be transmitted) using a suitable modulation technique [e.g., minimum shift keying ("MSK") modulation, Gaussian minimum shift keying ("GMSK") modulation, frequency shift keying ("FSK") modulation, differential frequency shift keying ("differential FSK") modulation, Gaussian frequency shift keying ("GFSK") modulation, etc.], and can transmit the modulated signal to the receiver 30 via the transmitting antenna 35. The receiver 30 can receive the modulated signal via the receiving antenna array 40 and can process or demodulate the modulated signal using a suitable demodulation technique [e.g., minimum shift keying ("MSK") demodulation, Gaussian minimum shift keying ("GMSK") demodulation, frequency shift keying ("FSK") demodulation, differential frequency shift keying ("differential FSK") demodulation, Gaussian frequency shift keying ("GFSK") demodulation, a combination of parallel demodulation techniques, such as, a combination of the demodulation techniques listed above, etc.] to reproduce the payload data.

The transmitter 25 can encode payload data according to a packetized protocol or packet-orientated protocol. A packet-orientated protocol arranges payload data into data packets. In one embodiment, the protocol is designed to periodically transmit a stream of data packets that contains no signal data (or non-critical application data) in between periods of data transmission. Thus, a time period of no signal data transmission (i.e., the transmission of "empty" data or non-critical data) followed by a time period of signal data transmission (i.e., the transmission of actual data) is repeated throughout the modulated signal.

In one embodiment, the transmitter 25 can acquire data and the data can be filtered and transmitted to the receiver 30 at a rate of approximately 120 samples-per-second. The transmitter 25 can transmit the data at a rate of approximately 10 Kilo-bytes per-second ("Kbps") in a protocol that specifies 125 packets-per-second. Each packet of data can contain one or more samples of the 120 Hz signal acquired by the transmitter 25. This may result in only 120 packets of the 125 packets-per-second containing the acquired data, and the remaining packets may not contain any actual data. In one embodiment, the remaining five packets do not contain any data and are referred to as "blank packets."

Blank packets may have unique identifiers, may be grouped together in time, and may be periodic.

In one embodiment, the packetized protocol can organize data into 120 packets to be transmitted each second. The packetized protocol also label the first data packet as data packet 0 ("DP0") and the last data packet as data packet 119 ("DP119"), with the data packets between data packets DP0 and DP 119 being labeled accordingly. Data packets DP0 through DP119 can be arranged in sequential and consecutive order. A series of five consecutive blank data packets [blank packet 0 ("BP0") through blank packet 4 ("BP4")] can be positioned after the last data packet DP119 in the modulated signal. The occurrence in the modulated signal or the "burst" of five blank data packets BP0 through BP4 can occur once per second. In other embodiments, the total number of data packets and/or blank packets can differ or the packetized protocol can organize the data into any suitable pattern and number of data packets and/or blank packets.

In one embodiment, the receiver 30 can receive the first blank packet BP0 and can estimate the time period until the next group of blank packets should be received. In general, this time period is estimated, as opposed to being known, due to non-constant pipeline delays in the receiver 30. After the estimated time period elapses, the receiver 30 may stop demodulating the incoming signal and perform system calculations. For example, the system calculations can include switching through all of the receiving antennas in the receiving antenna array 40 and estimating certain parameters for each receiving antenna, as will be discussed below.

Figure 2:
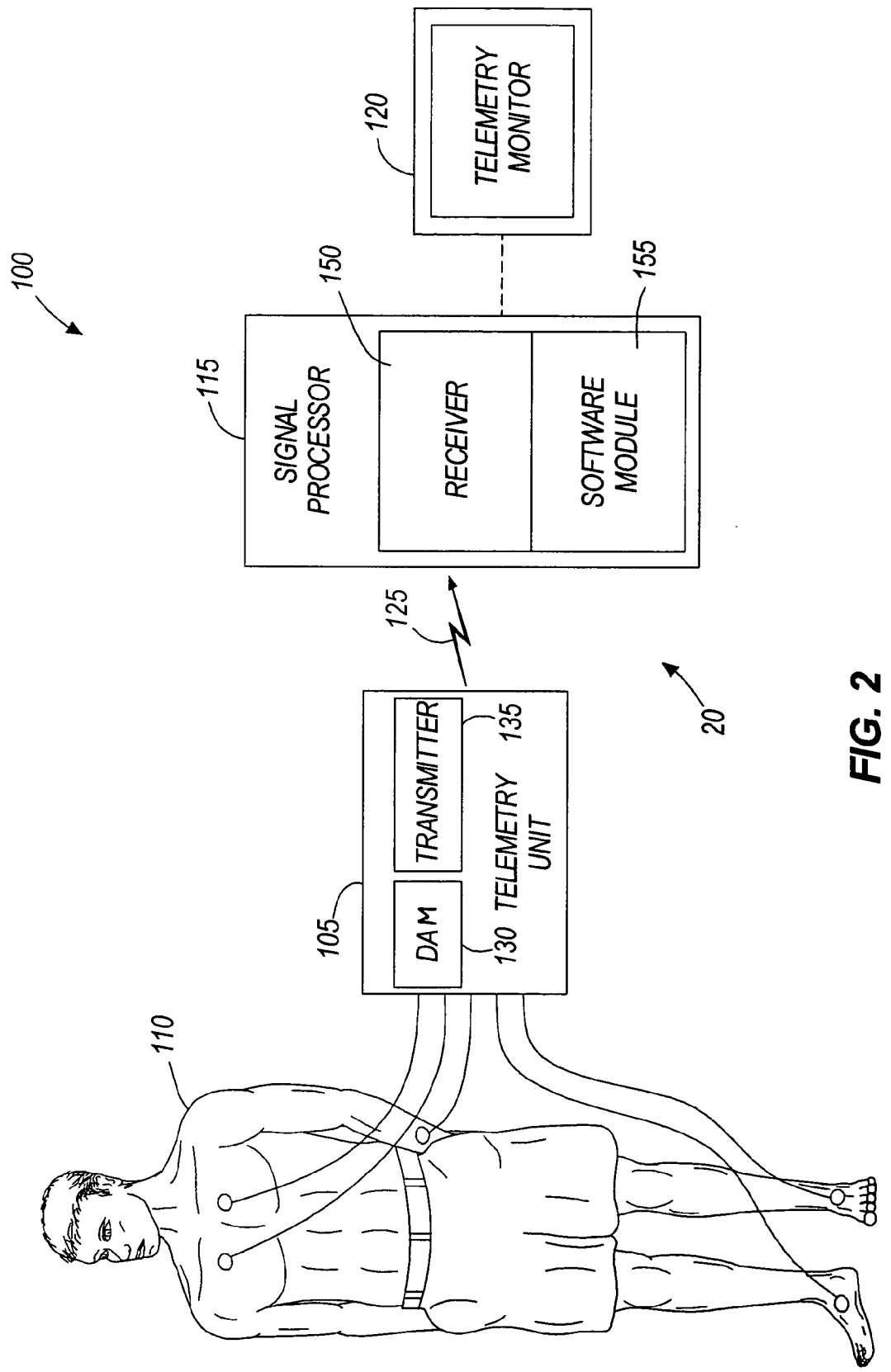
FIG. 2 is a schematic illustration of a telemetry system for use with the wireless communication system of FIG. 1.

The communication system 20 can be used in a number of wireless communication applications and systems, such as, for example, telemetry systems, cellular telephone systems, satellite transmissions, etc. In one embodiment, as shown in FIG. 2, the communication system 20 is included in a telemetry system 100. The telemetry system 100 includes a telemetry unit 105 that acquires and monitors patient data from an ambulatory patient 110. In this embodiment, the payload data is the data acquired from the patient 110. The telemetry unit 105 can transfer the acquired patient data to a signal processor 115 and/or a telemetry monitor 120 across a wireless link or transmission channel 125.

As shown in FIG. 2, the telemetry unit 105 can include a data acquisition module ("DAM") 130 and a transmitter 135. The transmitter 135 can employ the various modulation techniques employed by the transmitter 25 described above with respect to FIG. 1. In some embodiments, the data acquisition module 130 receives and processes input patient data, such as ECG signals and/or blood pressure signals. In some embodiments, the data acquisition module 130 conditions the input patient data into a desired signal or readable output which is transmitted to the signal processor 115 by the transmitter 135. In other embodiments, the transmitter 135 conditions the input patient data acquired by the data acquisition module 130 and modulates the data into a modulated signal. The transmitter 135 can transmit the modulated signal over the transmission channel 125. In one embodiment, the transmitter 135 uses the GFSK modulation technique, and the transmission channel 125 operates in a frequency range of approximately 560 MHz to approximately 614 MHz. In some embodiments, the transmission channel 125 operates in additional or alternative frequency ranges, such as, for example, a frequency range of approximately 420 MHz to approximately 474 MHz and/or a frequency range of approximately 190 MHz to approximately 220 MHz. The transmission channel 125 can also operate in any suitable frequency range specified by various international regulations.

As shown in FIG. 2, the signal processor 115 can include a receiver 150 and a software module 155. The receiver 150 can be another embodiment of the receiver 30 as shown and described with respect to FIG. 1. The software module 155 can provide the necessary instructions for conditioning the modulated signal received by the receiver 150 and can perform any additional functions for the signal processor 115. In some embodiments, the software module 155 can provide similar demodulation techniques and/or functions to demodulate and/or process the modulated signal, as described with respect to receiver 30.

During operation, as the patient is moving (and thus, the transmitter 135 is moving), the signal strength available to the receiver 150 on each receiving antenna field can vary. In one embodiment, the receiver 150 can perform an antenna-switching algorithm to select the appropriate receiving antenna field, as will be discussed below.

At the beginning of the blank period (i.e., a time period of no signal data transmission, such as the five blank data packets BP0 to BP4 described above), the receiver 30 can select which receiving antenna field is to be tested, and the DSP 95 can activate that receiving antenna field. The DSP 95 can wait for a predefined time period to allow the hardware to stabilize before calculations are made. After the predefined time period, the DSP 95 can perform a calculation for the estimation of signal quality for this particular receiving antenna field. In one embodiment, the DSP 95 can estimate the signal-to-noise ratio ("SNR") of the modulated signal. In another embodiment, the DSP 95 can estimate the received power of the modulated signal, as well as the SNR, or as an alternative to the SNR.

During the blank period, the receiver 30 can test several of the receiving antenna fields. In one embodiment, the receiver 30 can test one or more receiving antenna fields during a first blank period, and then test another or more receiving antenna fields during a second blank period. In another embodiment, the receiver 30 can test all of the receiving antenna fields during each blank period or during specific blank periods. If more than one receiving antenna field is to be measured during one blank period, the receiver 30 can select the receiving antenna field to be measured, and the DSP 95 can activate the selected receiving antenna field.

In one embodiment, after all the desired receiving antenna fields are measured during one or more blank periods, the receiver 30 can re-synchronize and begin tracking the frequency and bit timing of the received modulated signal during the time remaining in the blank period. This can allow the receiver 30 to continue to receive data packets with limited demodulation errors. At the end of the blank period, the DSP 95 can determine which receiving antenna field to select and can activate that receiving antenna field.

In one embodiment, the probability of selecting any one of the receiving antenna fields 50, 55, 60, and 65 for parameter estimation and measurement can be substantially equal for all the receiving antenna fields 50, 55, 60, and 65. If all the receiving antenna fields 50, 55, 60, and 65 are being selected for parameter estimation by the DSP 95 at approximately the same frequency, then the determination of the selected receiving antenna field can be based on the more recent SNR estimates for the receiving antenna fields 50, 55, 60, 65, as opposed to selecting one of the receiving antenna fields more frequently than the other fields (thus, the DSP 95 would not be obtaining as recent SNR estimations for the other receiving antenna fields).

In some embodiments, the receiver can 30 select the receiving antenna field based (at least in part) on the SNR of the modulated signal. The receiver 30 can estimate the SNR of the modulated signal for a certain number of receiving antenna fields (e.g., the first receiving antenna field 50, the first and second receiving antenna field 50 and 55, or all of the receiving antenna fields 50, 55, 60, and 65) during one or more blank periods. In one embodiment, the receiver 30 can estimate the SNR using the $M_2M_4$ Method. The $M_2M_4$ Method calculates SNR from the estimated second moment, $M_2$, and the fourth moment, $M_4$, as shown in equations [e1] to [e3] as follows:

$$M_2 = P = \sum_{n=1}^{N} |x_n|^2 \qquad [e1]$$

$$M_4 = \sum_{n=1}^{N} |x_n|^4 \qquad [e2]$$

$$SNR = \frac{\sqrt{2M_2^2 - M_4}}{M_2 - \sqrt{2M_2^2 - M_4}} \qquad [e3]$$

wherein $x_n$ is the $n^{th}$ complex sample from the current receiving antenna field and N is the number of samples used in the computation. In this embodiment, the $M_2M_4$ Method is a non-data-aided estimation, because the method does not require demodulation of the modulated signal.

Using the $M_2M_4$ Method, all amplifiers in the communication system 20 can operate in a linear region in order to produce a reliable SNR estimate and improved estimations. For example, if the signal strength of the amplified signal is too high, the amplifiers may saturate and the SNR estimate may be over-estimated. If the signal strength is too low, the noise floor of the receiver 30 may dominate the SNR estimate.

Figure 3:
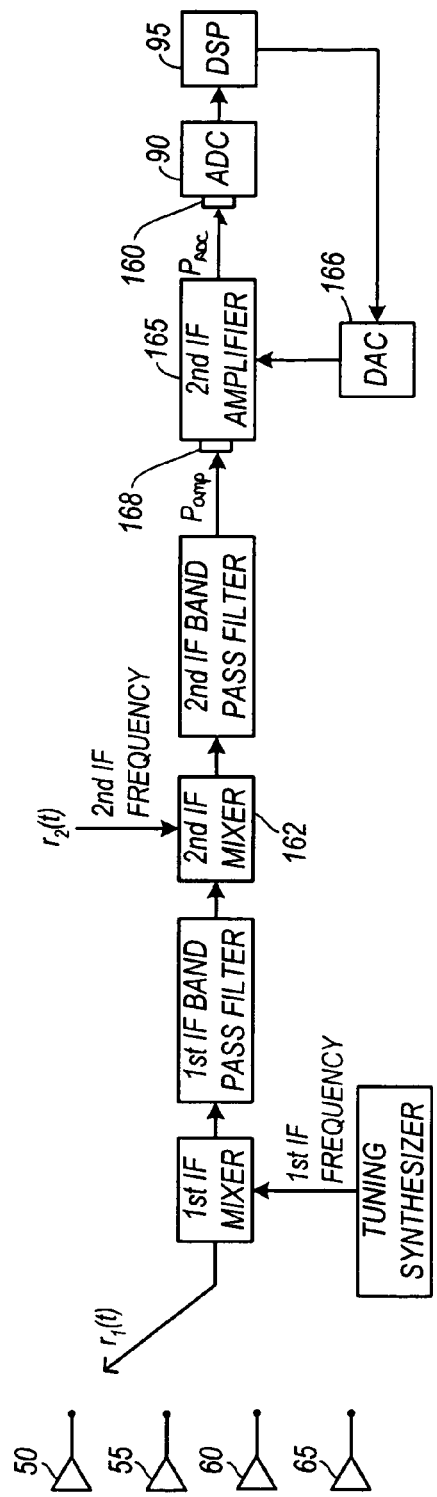
FIG. 3 is a schematic illustration of a receiver for implementing a gain control method for use in the wireless communication system of FIG. 1.

One embodiment of a gain control (or signal strength control) method for use in a receiver is schematically illustrated in FIG. 3. A voltage-controlled, variable gain amplifier 165 can be employed in the system 20. The amplifier gain can be controlled just low enough to prevent over estimation of SNR due to saturation while still providing enough amplification to prevent under estimation of actual received SNR due to receiver noise floor. In one embodiment, one technique is to control the gain of the amplifier 165 to maintain a constant signal strength $P_{opt}$ at the input 160 of the baseband receiver 90.

Also in the embodiment shown, a mixer 162 can combine a second signal $r_2(t)$ (which, in one embodiment, can be located near saturation within the linear region of the amplifier 165, or can be located within the linear region of the amplifier 156, but not near saturation in another embodiment) with the received modulated signal $r_1(t)$. In one embodiment, the frequency of the second signal $r_2(t)$ can be approximately 87.305 MHz.

Figure 4:
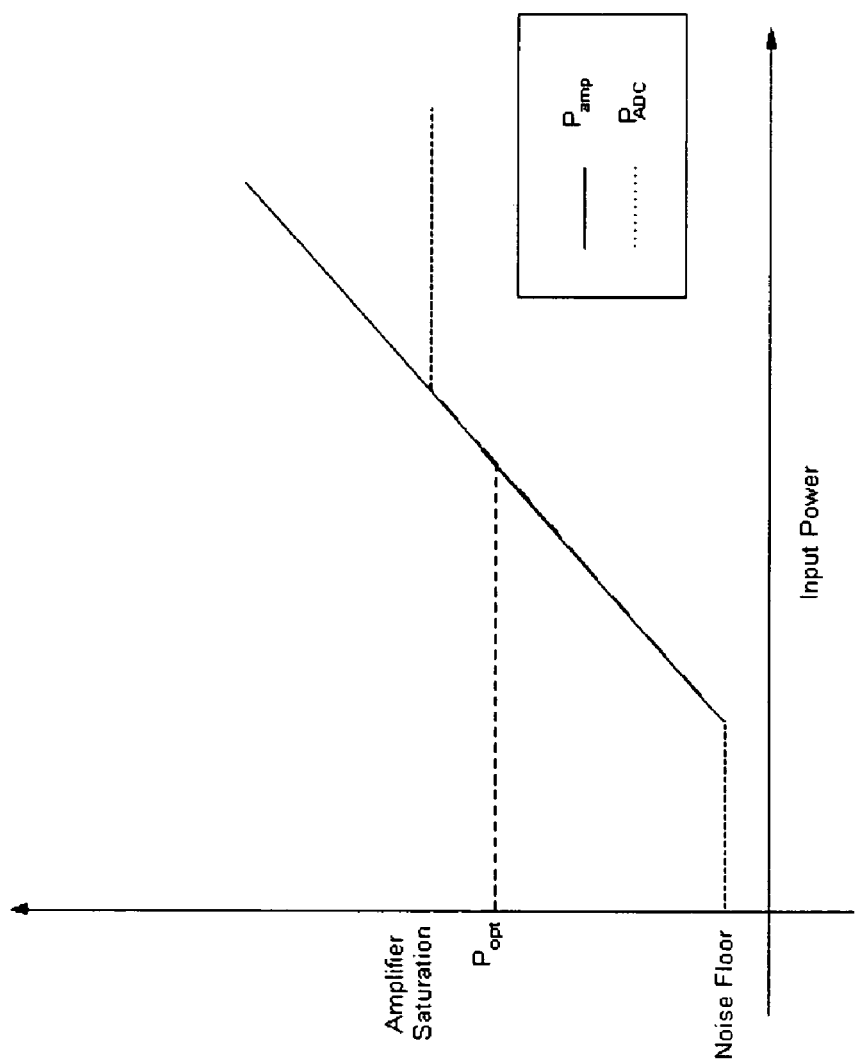
FIG. 4 is a graph illustrating the result of the gain control method of FIG. 3.

As shown in FIG. 3, the DSP 95 can estimate and store a signal strength $P_{ADC}$ for a particular receiving antenna field (e.g., the first receiving antenna field 50) at the input 160 of the baseband receiver 90. During the next blank period and before the SNR estimation of the first receiving antenna field 50, the DSP 50 can adjust the gain of the amplifier 165 to raise or set the signal strength $P_{ADC}$ to an optimal signal strength level $P_{opt}$ (as shown in FIG. 4). In one embodiment, the optimal level $P_{opt}$ can be approximately 42.8% of the log dynamic range of the $P_{ADC}$.

Referring to FIG. 3, the digital-to-analog converter ("DAC") 166 can convert the control signal of the DSP 95 for adjusting the gain of the amplifier 165 from a digital control signal to an analog control signal. After the DSP 95 adjusts the control signal, the DSP 95 can conduct the estimation or measurement for the first receiving antenna field 50.

In some embodiments, as discussed above, multiple receiving antenna fields are measured during one blank time period. In these embodiments, the DSP 95 can apply a new adjustment corresponding to the previous estimated signal strength $P_{ADC}$ for that particular receiving antenna field (e.g., the first receiving antenna field 50) to the gain of the amplifier 165 before the DSP 95 performs the SNR estimation. When all the receiving antenna fields have been measured, the gain for amplifier 165 can be reset to a full gain during time periods of data transmission (i.e., when the receiver 30 is receiving data packets).

In one embodiment, the DSP 95 can estimate the power $P_{amp}$ at the input 168 of the amplifier 165 with wide dynamic range. For all the receiving antenna fields 50, 55, 60, and 65, the DSP 95 can estimate the power $P_{amp}$ at the amplifier 165 from the following: the power $P_{ADC}$ at the input 160 of the baseband receiver 90, the value of the DAC 166 setting corresponding to a power of the signal strength $P_{ADC}$, and the relationship between power $P_{ADC}$ and DAC counts.

Figure 7:
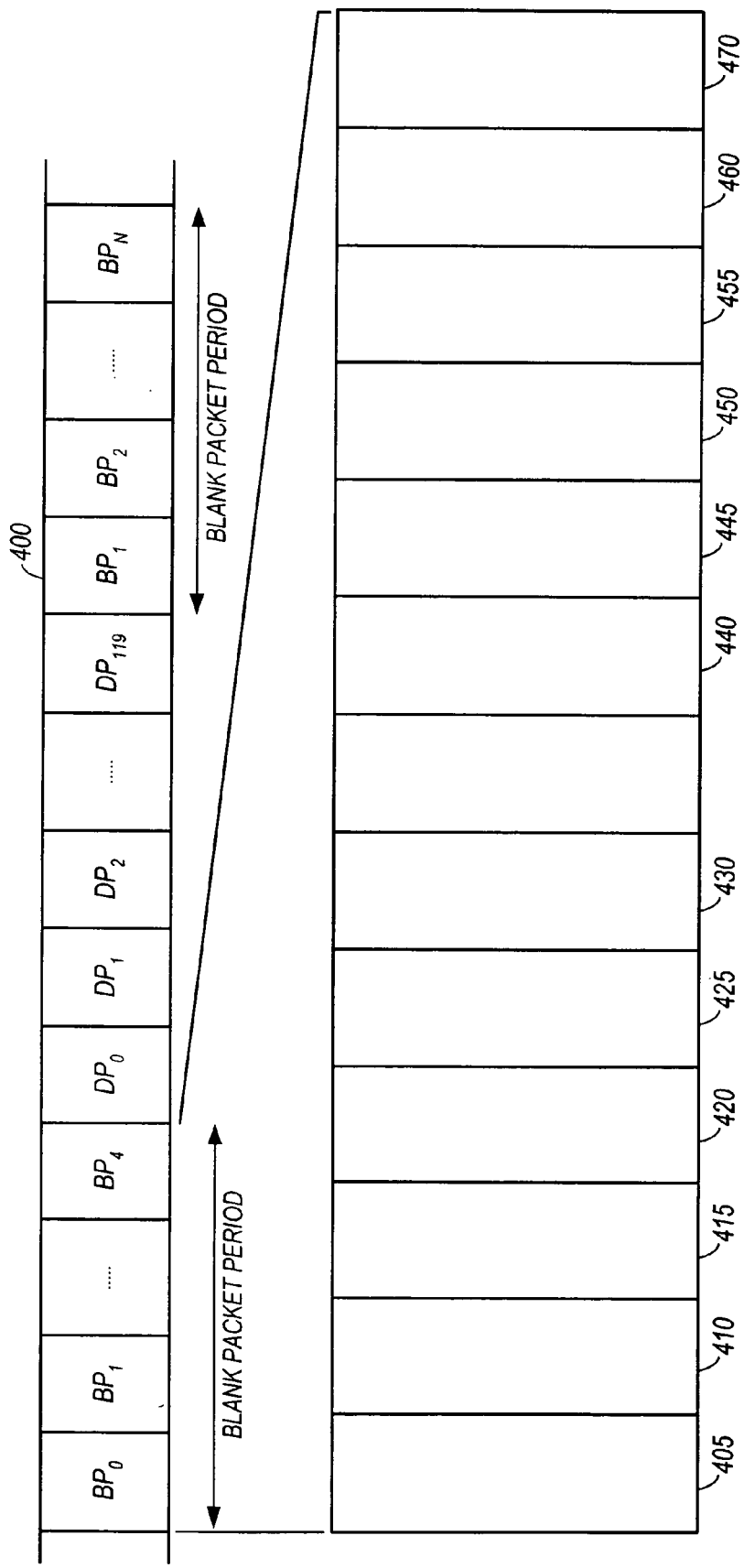
FIG. 7 is a schematic illustration of the transmission protocol employed by the wireless communication system of FIG. 1.

As shown in FIG. 7, a modulated signal 400 can include blank packets BP0–BP4 and data packets DP0–DP119. During the blank period, the DSP 95 can select and activate (at 405) the first receiving antenna field 50. The DSP 95 can adjust (at 410) the gain of the amplifier 165 to produce the optimal level $P_{opt}$. The DSP 95 can calculate (at 415) the SNR estimations for the first receiving antenna field 50. The DSP 95 can make similar adjustments and calculations (at 420, 425, 430, 440, 445 and 450) for the second, third, and fourth receiving antenna fields 55, 60, and 65, respectively. After the DSP 95 calculates estimations for the antenna fields 50, 55, 60, and 65, the DSP 95 can select and activate (at 455) the desired receiving antenna array. The DSP 95 can reset (at 460) the gain on the amplifier 165. The receiver 30 can begin (at 470) to re-track the frequency and bit timing of the modulated signal.

In another embodiment, the DSP 95 can estimate signal quality or SNR based on a data-aided estimation. In this embodiment, the receiver 30 can use the previous decision statistic y[i] as determined by the baseband receiver 90 for the SNR estimations. One embodiment of a baseband receiver 90 is shown in FIG. 5.

Figure 5:
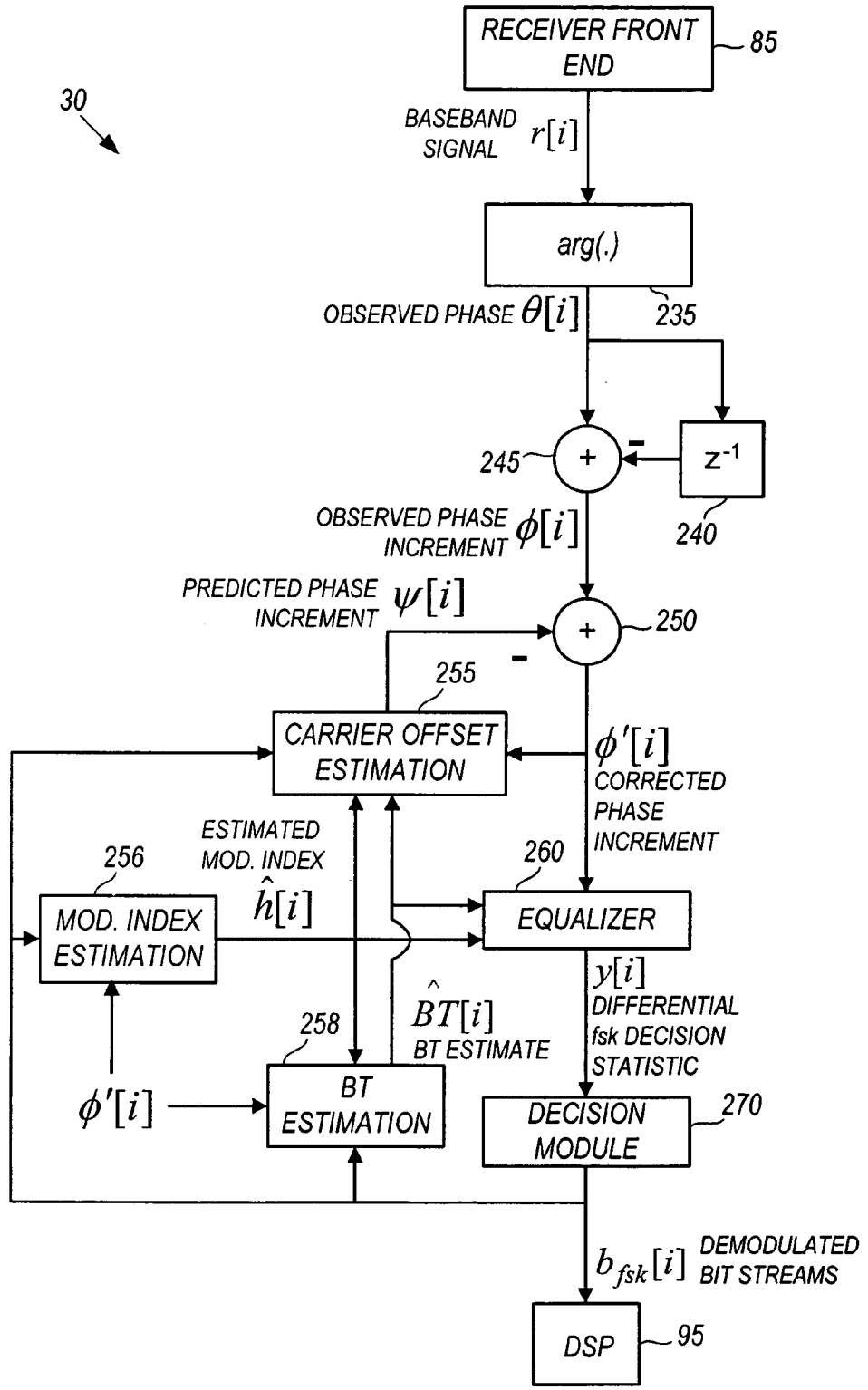
FIG. 5 is a schematic illustration of a baseband receiver for use in the wireless communication system of FIG. 1.

As shown in FIG. 5, the receiver front-end 85 can output the discrete-time complex signal r[i] to the baseband receiver 90 for demodulation. Upon input from the receiver front-end 85, the baseband receiver 90 can extract the instantaneous observed phase θ[i] from the discrete-time complex baseband signal r[i] for each bit interval using phase module 235 [i.e., arg(.)]. The observed phase increment ϕ[i] can be computed as the first-difference of the instantaneous phase θ[i] by passing the instantaneous phase θ[i−1] through a sample delay (e.g., a 1-sample delay 240) to a combiner 245 where the instantaneous phase θ[i] (delayed by the 1-sample delay 240) is subtracted from the subsequent instantaneous phase θ[i].

The resulting observed phase increment ϕ[i] can pass through a second combiner 250 where the observed phase increment ϕ[i] can be combined with the predicted phase increment or correction phase ψ[i] (due to a constant carrier frequency offset of the transmitter 25 with respect to the center frequency tuned by the receiver 30). The second combiner 250 can produce a corrected phase increment ϕ'[i]. As shown in FIG. 5, the correction phase ψ[i] can be subtracted from the observed phase increment ϕ[i] to obtain the corrected phase increment ϕ'[i]. As also shown in FIG. 5, the corrected phase increment ϕ'[i] can be used in various signal parameter estimation modules (e.g., a carrier offset estimation module 255, a modulation index estimation module 256, and a bandwidth-bit-duration estimation module 258).

At every time step or interval, the corrected phase increment ϕ'[i] can proceed to an equalizer 260. The equalizer 260 can be applied to the corrected phase increment ϕ'[i] to obtain the equalized or differential FSK decision statistic y[i]. In one embodiment, the equalizer 260 is an adaptive, linear equalizer that can operate in the linear region and can use various signal estimations and parameters to yield the equalized decision statistic y[i]. For example, the adaptive equalizer 260 can base its output on the incoming corrected phase increment ϕ'[i], an estimated filter bandwidth-bit-duration parameter BT[i], and an estimated modulation index parameter h[i]. In other embodiments, the equalizer 260 is not adaptive. A decision module 270 can apply a decision rule (e.g., the signum function) to the equalized decision statistic y[i] as determined by the equalizer 260 to yield a final bit stream $b_{fsk}[i]$.

Figure 6:
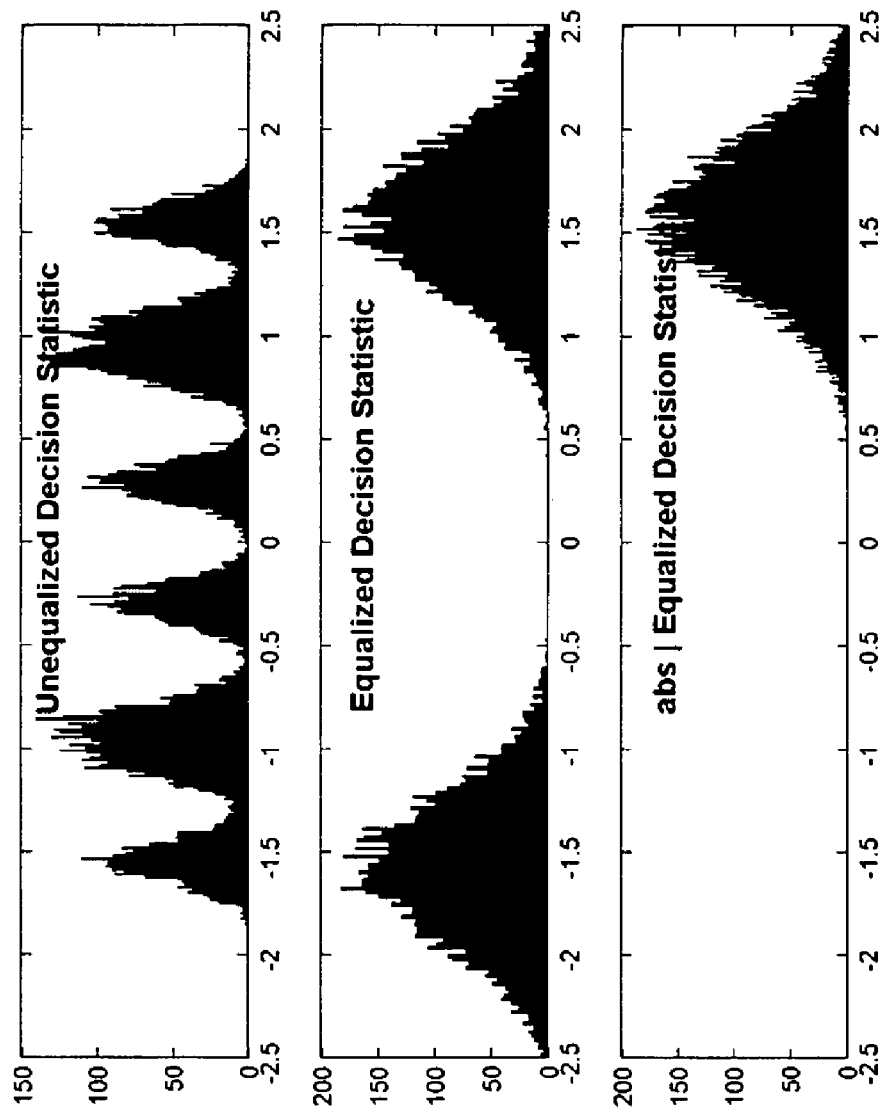
FIG. 6 illustrates histograms of a decision statistic.

Referring to FIG. 6, the distribution of y[i] is bi-modal. In order to obtain a measure of the quality of the modulated signal, the variance v of the absolute value of the equalized decision statistic y[i] can be estimated according to the following equations [e4] to [e6]:

$$y_1[i] = |y[i]| \quad [e4]$$

$$m = \frac{\sum_{i=1}^{N} y_1[i]}{N} \quad [e5]$$

$$v = \frac{\sum_{i=1}^{N} |y_1[i] - m|^2}{N} \quad [e6]$$

In another embodiment, the DSP 95 can select the receiving antenna field using the selection criteria of the relative power as calculated by equation [e1] and SNR. For example, the DSP 95 can select the receiving antenna field having the highest relative power (e.g., highest signal strength) and meeting a minimum SNR threshold. In another embodiment, the DSP 95 can select the receiving antenna field having the highest SNR and meeting a minimum relative power threshold.

In one embodiment, the receiver 30 employs a method of antenna lock-out as a preventative measure. In some instances, the estimated SNR on a particular receiving antenna field may be high, but data packets may still be dropped frequently when this particular field is selected as the active field. During data transmission, the receiver 30 can count the number of dropped data packets when the first receiving antenna field 50, for example, is active. The receiver 30 can implement a simple counter (or counting algorithm) that counts the number of bad data packets that have been received by the first receiving antenna field in a period of time. If the number of packets being dropped by the first receiving antenna field 50 is above a threshold, the first receiving antenna field 50 can be locked-out. In other words, the first receiving antenna field 50 is not selected as active for certain period of time (i.e., the lockout time). When the lockout time expires, the first receiving antenna field 50 can be selected to receive data again. If, for example, the first receiving antenna field 50 continues to repeatedly lock-out, the receiver 30 can disable the first receiving antenna field 50 and can indicate to an operator or user that the first receiving antenna field 50 requires maintenance.

Various features and advantages of the invention are set forth in the following claims.

The invention claimed is:

1. A method of selecting an antenna to receive a data signal, the method comprising:
   transmitting a data signal to an antenna array, the antenna array including at least a first antenna and a second antenna, the data signal including a time period without data transmission;
   estimating a first signal-to-noise ratio for the first antenna and a second signal-to-noise ratio for the second antenna during the time period without data transmission;
   selecting one of the first antenna and the second antenna based on a comparison between the first signal-to-noise ratio an d the second signal-to-noise ratio; and
   tracking the frequency and the bit timing of the data signal after estimating the first signal-to-noise ratio for the first antenna and the second signal-to-noise for the second antenna.

2. The method of claim 1 and further comprising estimating the first signal-to-noise ratio and the second signal-to-noise ratio using a non-data-aided method of signal-to-noise estimation.

3. The method of claim 1 and further comprising estimating the first signal-to-noise ratio and the second signal-to-noise ratio using a data-aided method of signal-to-noise estimation.

4. The method of claim 3 and further comprising:
   demodulating the data signal; and
   estimating the first signal-to-noise ratio and the second signal-to-noise ratio using a data-aided method of signal-to-noise estimation based on the demodulated data signal.

5. The method of claim 1 and further comprising estimating a first relative power of the first antenna and a second relative power of the second antenna during the time period without data transmission.

6. The method of claim 5 and further comprising selecting one of the first antenna and the second antenna based on at least one of the comparison between the first relative power and the second relative power and the comparison between the first signal-to-noise ratio and the second signal-to-noise ratio.

7. The method of claim 6 and further comprising selecting one of the first antenna and the second antenna based on both the comparison between the first signal-to-noise ratio and the second signal-to-noise ratio and the comparison between the first relative power and second relative power.

8. The method of claim 1 and further comprising adjusting a gain of an amplifier during the time period without data transmission.

9. The method of claim 1 and further comprising locking out one of the first antenna and the second antenna when packet errors for the one of the first antenna and the second antenna exceeded a threshold.

10. The method of claim 9 and further comprising indicating to a user that one of the first antenna and the second antenna needs maintenance after at least one lock-out occurs.

11. The method of claim 1 and further comprising adjusting a gain of the data signal before estimating the first signal-to-noise ratio for the first antenna and the second signal-to-noise ratio for the second antenna.

12. The method of claim 11 and further comprising resetting the gain of the data signal after estimating the first signal-to-noise ratio for the first antenna and the second signal-to-noise ratio for the second antenna.

13. The method of claim 1 wherein the data signal includes a first time period without data transmission and a second time period without data transmission, and further comprising estimating the first signal-to-noise ratio during the first time period without data transmission and estimating the second signal-to-noise ratio during the second time period without data transmission.

14. The method of claim 1 and further comprising transmitting the data signal at a frequency range of one of approximately 560 to 614 mega-hertz, approximately 420 to 474 mega-hertz, and approximately 190 to 220 mega-hertz.

15. The method of claim 1 and further comprising transmitting a data signal including at least one of electrocardiogram data and blood pressure data.

16. The method of claim 1 and further comprising modulating the data signal using a modulation technique of at least one of minimum shift keying, Gaussian minimum shift keying, frequency shift keying, differential frequency shift keying, and Gaussian frequency shift keying.

17. The method of claim 1 wherein the data signal includes a first time period without data transmission and a second time period without data transmission, and further comprising estimating an interval between the first time period without data transmission and the second time period without data transmission.

18. The method of claim 1 and further comprising transmitting the data signal with 125 packets per second, with 5 packets per second being blanket packets, and estimating at least one of the first signal-to-noise ratio and the second signal-to-noise ratio during the 5 blank packet per second.

19. A communication system comprising:
   a transmitter that transmits a data signal, the data signal having a time period without data transmission; and
   a receiver that receives the data signal, the receiver including
      a first antenna,
      a second antenna,
      a switch that activates one of the first antenna and the second antenna, and
      a processor that estimates a first signal-to-noise ratio for the first antenna
   and a second signal-to-noise ratio for the second antenna during the time period without data transmission,
      the processor controlling the switch to select one of the first antenna and the second antenna based on a comparison between the first signal-to-noise and the second signal-to-noise ratio, wherein the processor tracks the frequency and the bit timing of the data signal after estimating the first signal-to-noise ratio for the first antenna and the second signal-to-noise ratio for the second antenna.

20. The communication system of claim 19 and further comprising an amplifier having a gain for amplifying the data signal, the processor adjusting the gain of the amplifier during the time period without data transmission.

21. The communication system of claim 19 wherein the processor estimates a firs relative power for the first antenna and a second relative power for the second antenna, the processor controlling the switch to select one of the first antenna and the second antenna based on a comparison between the first relative power and the second relative power.

22. The communication system of claim 19 wherein the processor controls the switch to lock-out one of the first antenna and the second antenna when packet errors for the one of the first antenna and the second antenna exceed a threshold.

23. The communication system of claim 22 wherein the processor indicates to a user that the one of the first antenna and the second antenna needs maintenance after at least one lock-out occurs.

24. The communication system of claim 19 wherein the processor adjusts a gain of the data signal before estimating the first signal-to-noise ratio for the first antenna and the second signal-to-noise ratio for the second antenna.

25. The communication system of claim 24 wherein the processor resets the gain of the data signal after estimating the first signal-to-noise ratio for the first antenna and the second signal-to-noise ratio for the second antenna.

26. The communication system of claim 19 wherein the data signal includes a first time period without data transmission and a second time period without data transmission, and wherein the processor estimates the first signal-to-noise ratio during the first time period without data transmission and estimates the second signal-to-noise ratio during the second time period without data transmission.

27. The communication system of claim 19 wherein the transmitter transmits the data signal at a frequency range of one of approximately 560 to 614 mega-hertz, approximately 420 to 474 mega-hertz, and approximately 190 to 220 mega-hertz.

28. The communication system of claim 19, wherein the transmitter transmits a data signal including at least one electrocardiogram data and blood pressure data.

29. The communication system of claim 19 wherein the transmitter modulates the data signal using a modulation technique of at least one minimum shift keying, Gaussian minimum shift keying, frequency shift keying, differential frequency shift keying, and Gaussian frequency shift keying.

30. The communication system of claim 19 wherein the data signal includes a first time period without data transmission and a second time period without data transmission, and wherein the processor estimates an interval between the first time period without data transmission and the second time period without data transmission.

31. The communication system of claim 19, wherein the transmitter transmits a data signal with 125 packets per second, with 5 packets per second being blank packets, and wherein the processor estimates at least one of the first signal-to-noise ratio and the second signal-to-noise ratio during the 5 blank packets per second.

* * * * *